Sept. 9, 1958  E. E. BOLDS ET AL  2,851,577
ELECTRIC HEATER ASSEMBLY
Filed March 21, 1957  2 Sheets-Sheet 1
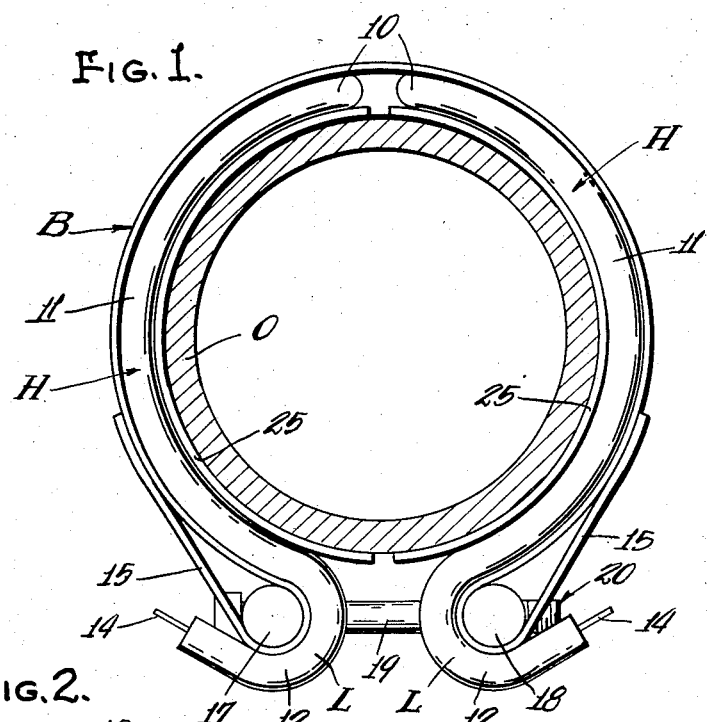
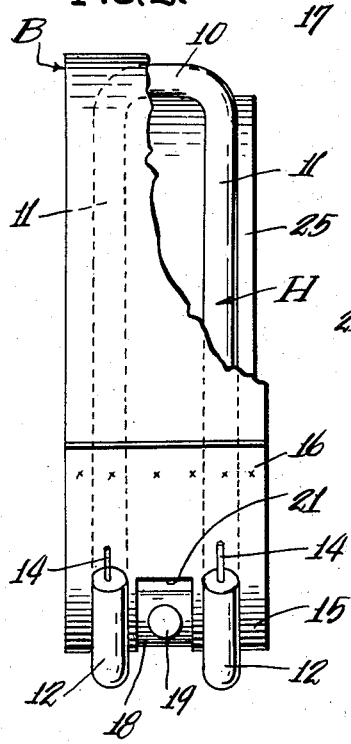
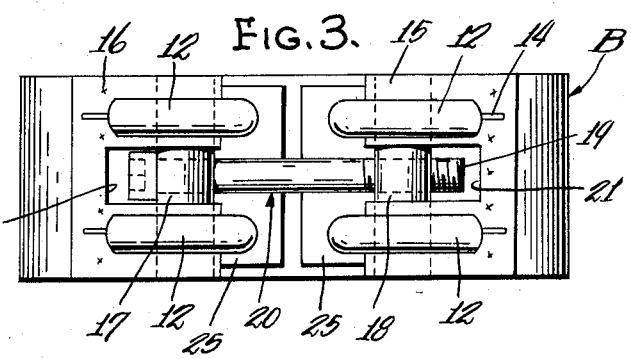
INVENTORS
ELDEN E. BOLDS
and WILLIAM J. VOSS
By
ATTORNEY Sept. 9, 1958   E. E. BOLDS ET AL   2,851,577
ELECTRIC HEATER ASSEMBLY
Filed March 21, 1957                      2 Sheets-Sheet 2
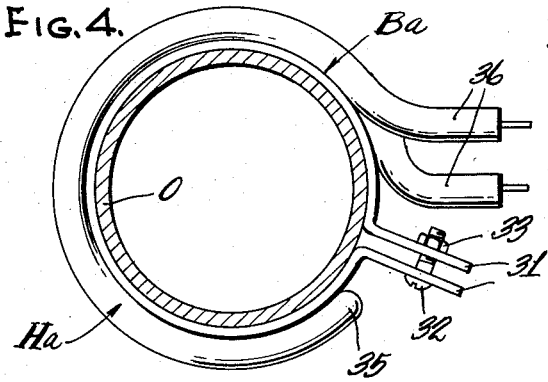
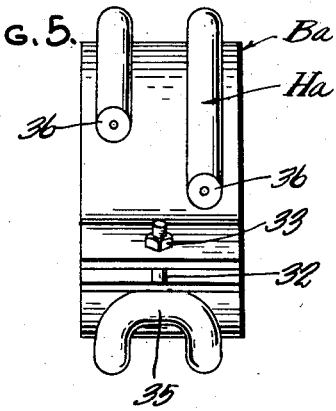
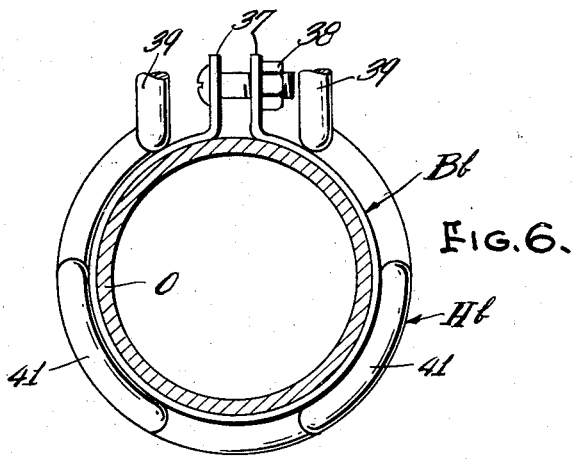
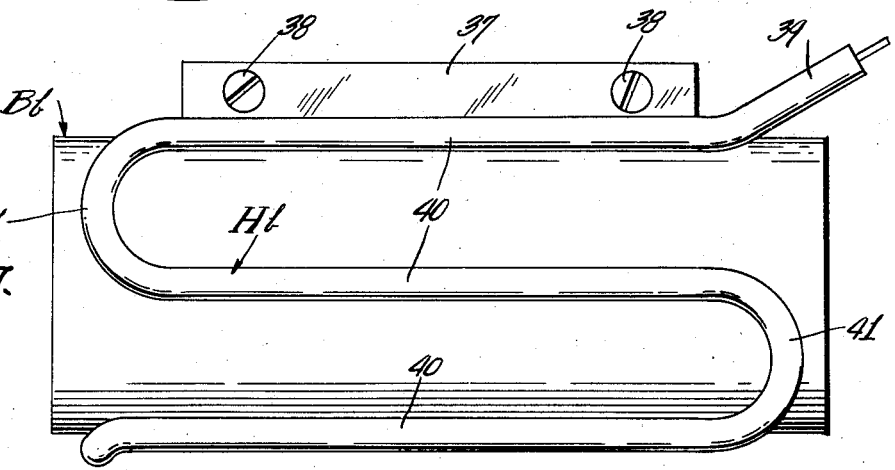
INVENTORS
ELDEN E. BOLDS
WILLIAM J. VOSS
BY
ATTORNEY

United States Patent Office 2,851,577
Patented Sept. 9, 1958

2,851,577
ELECTRIC HEATER ASSEMBLY

Elden E. Bolds and William J. Voss, Lakewood, Ohio, assignors to Edwin L. Wiegand Company, Pittsburgh, Pa.

Application March 21, 1957, Serial No. 647,515

13 Claims. (Cl. 219—38)

Our invention relates to electric heater assemblies and the principal object of our invention is to provide new and improved assemblies of this character.

In the drawings accompanying this specification and forming a part of this application, there are shown, for purposes of illustration, various embodiments which our invention may assume, and in these drawings:

Figure 1 is an end view of an embodiment of our invention, the object to be heated being shown in section, Figure 2 is a side elevational view of the embodiment shown in Figure 1, parts being broken away to more clearly disclose construction, Figure 3 is a bottom plan view of the embodiment shown in Figure 1, Figure 4 is an end view of another embodiment of our invention, Figure 5 is a side elevational view of the embodiment shown in Figure 4, Figure 6 is an end view of still another embodiment of our invention, and Figure 7 is a side elevational view of the embodiment shown in Figure 6.

Our invention generally comprises an assembly including an electric heating element and means for holding such element in heat transfer relationship with an object to be heated. The heated object in this disclosure has a non-planar surface and the heating element is configured to generally correspond to such surface, and means are included in the assembly for holding the heating element in heat transfer relation with the object. The object may have any outline, such as round, oval and the like and, although the heater assembly may in some form be used in connection with an object having a polygonal outline, it is preferably adapted for use with a cylindrical object.

Referring to the embodiment of the invention disclosed in Figures 1 through 3, the object O to be heated is circular in cross-section and the wall shown in this embodiment may form part of a water tank, a nozzle for a plastic injection molding machine or any other structure within which is contained, or through which passes, material to be heated.

The electric heater shown in the embodiments herein disclosed is of the sheathed type comprising a metallic tubular sheath within which is contained a resistance conductor and material which serves to electrically insulate the conductor from the sheath and also serves to transfer heat from the conductor to the sheath. Heating elements of this type are well known and form no part, per se of our invention. As an example of a heating element which may be used in this invention, reference is made to the construction disclosed in United States Letters Patent 2,375,058, issued May 1, 1945, to Edwin L. Wiegand, and assigned to the assignee of this application.

Tubular elements of the type disclosed in the above noted patent may be bent to various shapes and, in the embodiment disclosed in Figures 1 through 3, the element is bent to a hair-pin shape, which shape provides a bight and a pair of legs extending from the bight. In this embodiment, two heating elements H are used in the heater assembly, although it will be appreciated that only one may be used.

Each of the heating elements H is of the hair-pin type and has a bight 10 and legs 11—11 extending from the bight. Each of the legs has a terminal portion 12 from which the end of a terminal pin 14 extends for purposes of electrical connection. The terminal pins 14—14 of each element are mechanically and electrically connected to opposite ends of a resistance conductor, which may be a helical coil of resistance wire contained within the sheath. In this respect, attention is directed to the construction illustrated in the above noted patent. Since the terminal pins provide for less resistance to the flow of electrical current, the terminal portions 12—12 of the heating elements are relatively colder than the heated active section of the element which includes the legs and bight portion.

As best seen in Figure 1, the legs and bight of the heating elements are curved to generally correspond to the transverse shape of the wall of the object O and, although the elements will generally retain such curvature, they possess sufficient flexibility to yield to pressure applied to slightly change their curvature. If desired, the ends of the legs 11—11 and their terminal portions 12, may be reversely bent, as seen in Figure 1, to form a loop L for a purpose to be disclosed.

Means are provided to hold the heating elements in good heat transfer relationship with the object O and, as shown in the embodiment illustrated in Figures 1 through 3, a clamping band B is provided for the purpose. The band B is preferably formed of a thin sheet metal, such as stainless steel for example, which will permit considerable flexing. The band is split and has means at its end for tightly drawing it about the object O.

In the disclosed embodiment, the ends of the band are turned over to form loops 15, the extreme ends of the band being secured, as by spot welding 16, to an intermediate part of the band. Cylindrical plugs 17, 18 may be disposed within respective loops 15—15, the plug 17 having a transverse aperture for passing the shank 19 of a socket head bolt 20 and the plug 18 having a threaded opening for threadedly receiving the threaded portion of the shank 19. The loops 15—15 of the band may have cut-away parts to form openings 21—21 to provide for manipulation of the bolt 20.

It will be appreciated that the bolt 20 may be unscrewed from the plug 18 so that the split band may be opened sufficiently to remove it in a lateral direction from the object O. In this connection, it is pointed out that two heating elements are preferred to one, since in certain cases the assembly may not be inserted from an end of the object O. The two curved elements H therefore may be positioned about the object O without requiring the great amount of flexing which would be required if a single ring-shaped element were employed. Since the band B is formed of flexible material, repeated opening of the band will have no adverse effect on it.

The loops L of the heating elements need not be employed and, if desired, the terminal portions of the legs of each element may be shaped to clear through the split without looping. The loops L, in some cases, are preferred for the reason that they form a socket into which the split ends of the clamping band fit and also for the reason that electrical connections to the heating elements may be easily made.

It will be appreciated that proper threading action of the bolt 20 will draw the split ends of the band B together to tightly clamp the heater elements about the object O. Pressure exerted by the clamping action will cause the heating elements to conform to the wall of the object O and sufficiently engage for good thermal transfer. It will be noted that the elements are preferably aligned longitudinally and have active heating portions of a length so that each extend substantially half way around the wall of the object O. The bights of the heating elements are preferably positioned adjacent to each other at an intermediate point of the band B so that the terminal portions will be positioned adjacent to each other and at the split of the band.

Particularly in cases where the heating elements H have a high watt density, it is preferable to interpose means between the heating elements and the wall of the object O to effect greater heat distribution; accordingly, the shoes 25—25 may be employed. Each shoe is formed of heat conducting metal and shaped to an arcuate band form. As seen in Figure 1, each shoe is slightly less than one half of the circumference of the wall of the object O to allow for expansion.

Each shoe is wider than the spacing of the legs 11—11 of a respective heating element and therefore dissipates heat from the element over a relatively large surface of the wall of the object O. The shoes may be secured to the respective heating elements, as by welding, brazing, or the like, although in the presently disclosed embodiment the shoes are not so held assembled to reduce manufacturing costs.

To assemble the heater construction with the object O, it is merely necessary to position the heating elements H and shoes 25 against the wall of the object O, and then flex the band B sufficiently to clear the largest diameter of such assembly, whereupon the band B may be moved laterally to position and released to encircle the heaters. Tightening of the bolt 20 will securely clamp the assembly.

The embodiment of the invention disclosed in Figures 4 and 5 comprises a split band Ba formed of any suitable metal which will permit flexing. The band has radially extending ears 31—31 at its split, and a bolt 32 passes through aligned openings in the ears and, in cooperation with a nut 33, draws the band tightly around the wall of the object O.

In this embodiment, the heating element Ha is disposed exteriorly of the band Ba and connected thereto. As shown, a single heating element is provided, and this element is of the sheathed type as previously described, and of hair-pin formation. The bight and legs of the heating element are bent to the arcuate shape shown in Figure 4 so as to generally correspond to the curvature of the wall of the object. The element is then connected to the band in any suitable manner, such as by brazing the metal sheath of the element to the exterior surface of the band throughout their surfaces of engagement.

The bight 35 of the element is positioned adjacent to one split end of the band and the terminal portions 36—36 of the element are positioned adjacent to the other split end of the band, the terminal portions extending laterally from the band to facilitate electrical connection.

The embodiment of the invention shown in Figures 4 and 5 is particularly adapted for endwise assembly with the object O and the nut and bolt connection will tightly secure the heater assembly to the object. It is pointed out that the relatively wide band performs the dual function of supporting the heating element in heating relation with the object and distributing heat over a relatively large area of the object O.

In the embodiment of the invention disclosed in Figures 6 and 7, a split band Bb is employed, this band being considerably wider than the band Ba, and formed with radially extending ears 37—37 at its split ends. Several nut and bolt combinations 38 may be used to tightly secure the band Bb around the object O.

In this embodiment, the heating element Hb is of modified hair-pin configuration. As shown, the terminal portions 39—39 of the heating element are disposed at one end of the band and on opposite sides of the split in the band. The element is formed in serpentine fashion to provide legs 40 joined by bights 41 and the element and band may be connected at all interengaging surfaces by any suitable means, such as brazing. The heater assembly of this embodiment, it will be appreciated, distributes heat over a relatively large area of the wall of the object O.

In view of the foregoing it will be apparent to those skilled in the art that we have accomplished at least the principal object of our invention and it will also be apparent to those skilled in the art that the embodiments herein described may be variously changed and modified, without departing from the spirit of the invention, and that our invention is capable of uses and has advantages not herein specifically described; hence it will be appreciated that the herein disclosed embodiments are illustrative only, and that our invention is not limited thereto.

We claim:

1. An electric heater assembly to be positioned about an object to be heated, comprising a sheathed electric heating element configured to generally correspond to a surface of said object, metallic heat-conducting shoe means interposed between and in direct heat-conducting engagement with said heating element and said object, and clamping means for holding said heating element and said shoe means in heating relationship with said object.

2. An electric heater assembly to be positioned along a non-planar wall of an object to be heated comprising a sheathed electric heating element configured to generally correspond to the shape of said wall, metallic heat-conducting shoe means interposed between and in direct heat-conducting engagement with said heating element and said wall, and a clamping band adapted to be clamped to said object and when so clamped pressing against said heating element to press the latter against said shoe means and thereby press said shoe means against said wall.

3. An electric heater assembly to be positioned along a non-planar wall of an object to be heated, comprising a sheathed electric heating element of the hair-pin type including a bight and legs extending from said bight, said legs and bight being configured to generally correspond to the shape of said wall, metallic heat-conducting shoe means configured to generally correspond to the shape of said wall and interposed between and in direct heat-conducting engagement with said heating element and said wall, and a clamping band adapted to be clamped to said object and when so clamped pressing aginst said heating element to press the latter against said shoe means and thereby press said shoe means against said wall.

4. An electric heater assembly to be positioned about a cylindrical object, comprising a sheathed electric heating element curved to correspond generally to the curved wall of said object, metallic heat-conducting shoe means curved to correspond generally to the curved wall of said object and interposed between and in direct heat-conducting engagement with said heating element and said wall, and a clamping band adapted to be clamped transversely around said cylindrical object and when so clamped pressing against said heating element to press the latter against said shoe means and thereby press said shoe means against said wall.

5. An electric heater assembly to be positioned about a cylindrical object, comprising a sheathed electric heating element of the hair-pin type including a bight and legs extending from said bight, said legs and bight being curved to generally correspond to the curved wall of said cylindrical object, metallic heat-conducting shoe means curved to generally correspond to said curved wall and interposed between and in direct heat-conducting engagement with said heating element and said wall, and a clamping band adapted to be clamped transversely about said object and when so clamped pressing against said heating element to press the latter against said shoe means and thereby press said shoe means against said wall.

6. An electric heater assembly to be positioned about a cylindrical object, comprising a pair of sheathed electric heating elements of the hair-pin type, each including a bight and legs extending from said bight, the legs and bight of each element being curved to generally correspond to the transverse curvature of the wall of said object and said elements being positioned in longitudinal alignment about said wall, a pair of metallic arcuate heat transfer shoes positioned between and in direct heat-conducting engagement with said wall and respective elements, and a clamping band adapted to be clamped transversely about said object and in overlying relation with respect to said heating elements, said clamping band, when in clamping relation, pressing against said heating elements to press the latter against respective shoes and thereby press said shoes against said wall.

7. An electric heater assembly to be positioned about a cylindrical object, comprising a pair of sheathed electric heating elements of the hair-pin type, each including a bight and legs extending from said bight and having end terminal portions, the legs and bight of each element being curved to generally correspond to the transverse curvature of the wall of said object and said elements being positioned in longitudinal alignment about said wall with the bight of one adjacent to the bight of the other to thereby position the terminal portions of one adjacent to the terminal portions of the other, a pair of heat transfer shoes positioned between said wall and respective elements, a split band adapted to be clamped transversely about said object and in overlying relation with respect to said heating elements, the split of said band providing clearance for outward extension of the terminal portions of said heating elements, and means at the split of said band for tightly drawing the band about said heating elements to press the latter against respective heat transfer shoes and thereby press said shoes against the wall of said object.

8. An electric heater assembly to be positioned about a tubular object to be heated, comprising a clamping band adapted to be clamped transversely around said tubular object, and a sheathed electric heating element having a fused connection between its sheath and the exterior of said clamping band whereby said heating element is disposed in heat transfer relation with said object when said clamping band is clamped around said object.

9. An electric heater assembly to be positioned about a tubular object to be heated, comprising a clamping band adapted to be clamped transversely around said tubular object, and a sheathed electric heating element of the hair-pin type carried by said clamping band and disposed in direct heat transfer conduction with said object when said clamping means is clamped to said object.

10. An electric heater assembly to be positioned about a tubular object to be heated, comprising a split metallic clamping band having means at its split for tightly securing said band transversely about said object, and a sheathed electric heating element of the hair-pin type configured to correspond generally to the transverse configuration of said object, said element having a fused connection between its metal sheath and the exterior surface of said band and being held in heat transfer relation with said object when said band is tightly secured about the latter.

11. An electric heater assembly to be positioned about a cylindrical object to be heated comprising a split metallic ring-shaped band having means at its ends for tightly securing said band transversely about said object, and a sheathed electric heating element of the hair-pin type having a bight and legs extending from the bight, said legs and bight being curved to generally correspond to the transverse curvature of said object and said element having a fused connection between its metal sheath and the exterior surface of said band with the bight positioned adjacent one end of said split and the terminal ends of said legs positioned adjacent the other end of said split, said heating element being drawn into heat transfer relation with said object when said band is tightly secured about said object.

12. An electric heater assembly to be positioned about a cylindrical object to be heated, comprising a split metallic ring-shaped band having means at its ends for tightly securing said band transversely about said object, and an electric heating element having a metal sheath of serpentine formation, said sheath being connected to said band in superposed relation, and said heating element being drawn into heat transfer relation with said object when said band is tightly secured about said object.

13. An electric heater assembly to be positioned about a cylindrical object to be heated, comprising a pair of sheathed tubular electric heating elements of the hair-pin type, each including a bight and legs extending from the bight, the legs and bight of each element being curved to generally correspond to the transverse curvature of the wall of said object and said elements being positioned in longitudinal alignment about said wall and each heating a portion of the transverse extent of said wall, a heat-conducting shoe between and in direct heat-conducting engagement with said wall and each heating element, each shoe being formed of metal and having an arcuate shape generally corresponding to the curvature of said wall and its related heating element and being of sufficient thickness to generally retain such arcuate shape, and each shoe being of a width greater than the spacing between the legs of its related heating element whereby it spans said legs for good heat transfer, and a clamping band encircling said heating elements and pressing the latter against respective shoes to thereby press said shoes against said wall.

References Cited in the file of this patent

UNITED STATES PATENTS

| | | |
|---|---|---|
| 1,936,391 | Harrower | Nov. 21, 1933 |
| 2,029,075 | Knight | Jan. 28, 1936 |
| 2,367,369 | Osterheld | Jan. 16, 1945 |
| 2,469,801 | Vogel et al. | May 10, 1949 |
| 2,703,358 | Mertler | Mar. 1, 1955 |
| 2,725,457 | Norton | Nov. 29, 1955 |
| 2,742,561 | Flater | Apr. 17, 1956 |